July 28, 1970 R. H. NELSON ET AL 3,521,952

LIGHT EXPOSURE CONTROL UNIT

Filed July 13, 1967 2 Sheets-Sheet 1

INVENTORS.
ROBERT H. NELSON
RONALD P. SCHWENKER

BY

Paul & Paul
ATTORNEYS.

United States Patent Office 3,521,952
Patented July 28, 1970

3,521,952
LIGHT EXPOSURE CONTROL UNIT
Robert H. Nelson, 8 Plover Court, Brookmeade, Wilmington, Del. 19808, and Ronald P. Schwenker, Wilmington, Del.; said Schwenker assignor to said Nelson
Filed July 13, 1967, Ser. No. 653,255
Int. Cl. G03b 27/76
U.S. Cl. 355—38          10 Claims

ABSTRACT OF THE DISCLOSURE

A photographic light-exposure control unit controls the printing exposure for desired differences in magnification, density, color balance, and speed factor of the printing paper, relative to a reference print. A photosensitive cell is mounted, after the color filter but before the negative, to receive color-filtered light from the light source unchanged by the negative. Prior to the beginning of the exposure period, a capacitor network (the total capacitance of which is adjusted according to the desired density) is charged to an adjustable fraction of a regulated voltage according to adjustments to a magnification control and a speed-factor control. The length of the exposure period is controlled automatically by the amount of the charge in the capacitance network and its rate of discharge through the variable resistance of the photoconductive cell as determined by the amount of light received by the cell from the source through the color filter.

FIELD OF THE INVENTION

This invention relates to a control unit which may be used advantageously in the exposing of light-sensitive materials such as photographic film or paper, either monochrome or color.

The new control unit of the present invention may be used to advantage in the production of all types of photographs and particularly special purpose photographs, such as for advertising or other commercial or governmental purposes, where the photographs to be produced are not of the fixed magnifications ordinarily used in the exposing of photographic prints for the public.

SUMMARY OF THE INVENTION

One purpose of the invention is to provide a device for controlling automatically the exposure in the making of prints, either monochrome or color, regardless of magnification. The automatic exposure device of the present invention makes it possible for a person relatively unskilled in photographic techniques to produce special purpose photographs which heretofore have required the skill and time of the professional photographic processor.

A typical example of the use of the exposure device of the present invention would be as follows: A photographic print for advertising or other commercial purposes is to be produced. The professional processor, based on his experience, makes a first test print of small size, such as 4″ x 5″. The processor and his client examine the test print. They decide (1) that the print should be 11″ x 14″, (2) that a different printing material should be used, (3) that the density should be increased, and (4) that the color balance be changed such that the red tones would be more subdued and the blue tones accentuated. Having made these decisions, the next question is: What effect will these changes have on the exposure required for the printing as compared with the exposure used in making the test print? This question is answered automatically by the exposure device provided by the present invention. The processor may now turn the matter over to an operator not highly trained or skilled in photographic processing techniques. The operator, using available tables and charts, sets the controls on the exposure device to correspond to the new magnification factor (to accommodate for the desired enlargement and reciprocity factor), and to correspond to the new density factor (to accommodate for the increase in density desired). The operator alters the color of the exposing light to achieve the desired change in the color balance, then depresses the start button on the exposing device of the present invention and the device controls automatically the exposure for making the final print.

BRIEF DESCRIPTION OF THE DRAWING

How the foregoing is accomplished will be clear from the following detailed description, having reference to the drawings in which.

DESCRIPTION OF THE PREFERRED EMBODIMENT

Figure 1:
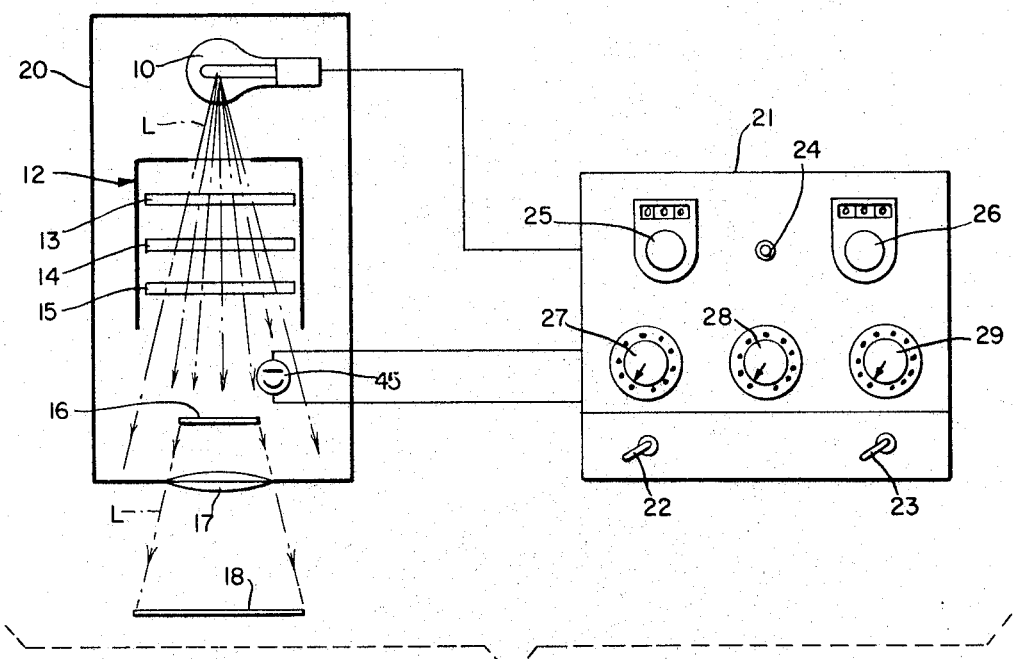
FIG. 1 is a simplified diagrammatic representation of a photographic enlarging system employing the automatic exposing device of the present invention.

Referring now to FIG. 1, there is shown diagrammatically a photographic enlarger system comprising a light source or lamp 10, a multi-color filter 12, a photographic negative 16, a focusing lens 17, and the printing material 18. All of these components, except the printing material 18 are contained in or supported by a housing 20, but no effort has been made to illustrate the structural mounting details since such means are well known.

The multi-color filter 12 is shown to include three different color filter elements 13, 14 and 15 which, in a typical case, will be cyan, magenta and yellow. Each of the color filter elements 13, 14 and 15 is also of varying density, increasing progressively in density from one marginal region to the other, and each filter element is separately adjustable so that by adjusting the filter elements 13, 14 and 15 a wide range of color filtration may be obtained. The lamp 10 and the multi-color filter 12 may, if desired, be a device known as a Chromega D. Lamphouse, a product of Simmon Brothers, Inc. of Long Island City, N.Y., embodying U.S. Pat. No. 3,027,801.

In accordance with the present invention, a light sensitive device or photo-conductive cell 45 is disposed with the housing 20 in a position to receive the filtered light from the light source 10. Preferably, the photo-conductive cell 45, masked or otherwise adjusted for the spectral response desired, is disposed within the housing 20 between the color filter 12 and the negative 16, but located to one side of the negative, in such position that the photo-cell 45 is within the filtered light beam L but does not intercept the filtered light which is directed to the negative 16. Positioning the photo-conductive cell between the color filter and the negative, rather than between the negative and the printing paper, is deemed important, at least to the preferred embodiment of the present invention.

In accordance with the present invention, and as illustrated diagrammatically in FIG. 1, a control box 21 is provided, having on its front panel a "focus" on-off toggle switch 22, a power on-off toggle switch 23, a spring-biased push-type start button 24, a material speed factor control knob 25, a magnification control knob 26, and three density-factor control knobs 27, 28 and 29.

Figure 2:
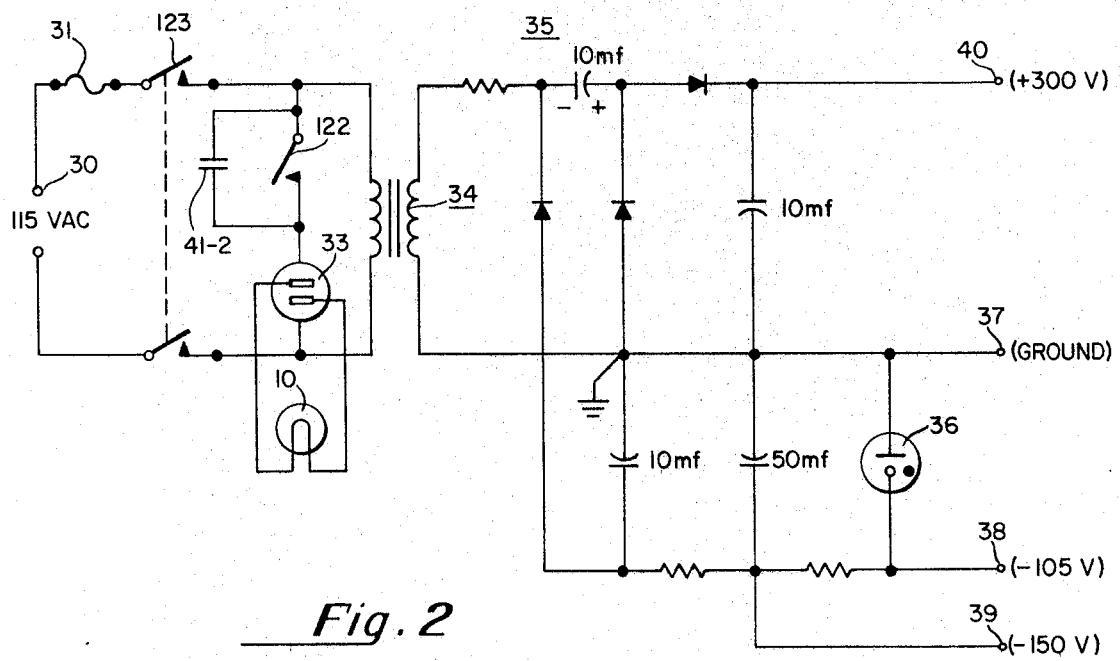
FIG. 2 is a schematic circuit diagram of the power supply for the exposing device.
Figure 3:
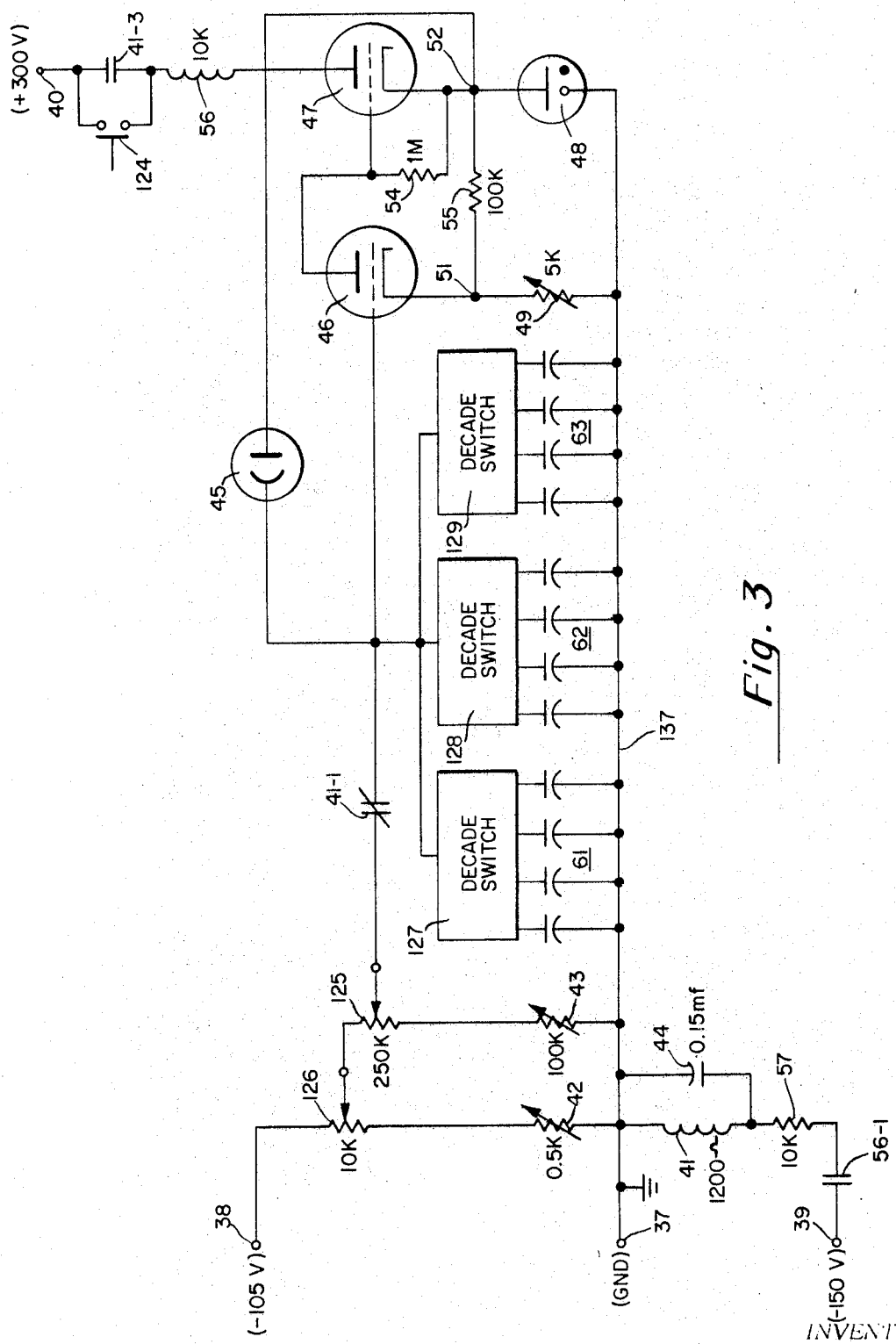
FIG. 3 is a schematic circuit diagram of the control system of the exposing device.

Inside the control box 21 is a power supply circuit and an exposure control circuit, shown schematically in FIGS. 2 and 3, respectively.

Referring now to FIG. 2, which shows schematically a suitable power supply circuit, the terminals 30 are connected to a suitable source of power, for example, a 115-volt alternating-current line. Reference numeral 31 identifies a fuse; 123 is a double-pole switch controlled by toggle switch 23 on the control panel; 33 is a socket for receiving the plug of a cord connected tot he light source or lamp 10; 34 is an isolation transformer; 35 identifies comprehensively a rectifier circuit of known form for developing between the ground terminal 37 and the terminal 40 a positive D-C voltage, for example, +300 volts. The reference numeral 36 identifies a voltage regulating tube or other device, such as a Zener diode, for developing between the ground terminal 37 and the terminal 38 a regulated negative voltage, for example, −105 volts. Between the ground terminal 37 and the terminal 39, an unregulated negative voltage, for example, −150 volts, is developed. Switch 122 in FIG. 2 is controlled by the toggle switch 22 on the control panel of the control box 21. Shunted across the switch 122 are the normally-open contacts 41–2 of a relay 41, shown in FIG. 3.

Reference is now made to FIG. 3, a schematic diagram of the circuitry of the present invention. In FIG. 3, component values are indicated, but it is to be understood that these merely represent suitable values for one operative circuit, and that other values may be employed.

Connected in series between the ground terminal 37 and the regulated negative voltage terminal 38 (−105 v.) is a calibrating rheostat 42 and the resistance element of a potentiometer 126. The movable arm of potentiometer 126 is adjustable by the control knob 26 on the panel of control box 21. Connected in series between the movable arm of potentiometer 126 and the ground lead 137 is the resistance element of a potentiometer 125 and a calibrating rheostat 43. The movable arm of potentiometer 125 is adjustable by the control knob 25 on the panel of control box 21. The movable arm of potentiometer 125 is connected through the normally-closed contacts 41–1 of a relay 41 to the grid of a triode 46, which may be one section of a double triode. The coil of relay 41 is connected between the ground terminal 37 and the negative voltage terminal 39 (−150 v.) in series with a resistor 57 and the normally-open contacts 56–1 of a relay 56.

The coil of relay 56 is connected between the positive voltage terminal 40 (+300 v.) and the anode of a triode 47, which may be the second section of a double triode. In series with the coil of relay 56 are the normally-open contacts 41–3 of the relay 41, and shunted across contacts 41–3 is the start switch 124 controlled by the spring-biased push button 24 on the panel of control box 21.

The anode of triode 46 is connected directly to the grid of triode 47 and is connected through a fixed resistor 54 to the cathode 52 of triode 47. The cathodes 51 and 52 of the two triodes 46 and 47 are connected together by a resistor 55. The cathode 51 of the triode 46 is connected to ground 137 through an adjustable resistor 29. The cathode 52 of triode 47 is connected to ground through a voltage-regulation tube (or other voltage regulating device).

Connected between the grid of the triode 46 and the ground leads 137 are three decade switches 127, 128 and 129. These switches are controlled by the knobs 27, 28 and 29 on the control panel of box 21. Each of the decade switches controls a capacitor network 61, 62 and 63, respectively. Each of the three capacitor networks 61, 62 and 63 comprise four capacitors. The four capacitors in network 61 may, for example, have values corresponding to 100, 200, 300 and 400 units (microfarads). The capacitors in network 62 may have values of 10, 20, 30 and 40 units. The capacitors in network 63 may have values 1, 2, 3 and 4 units. Decade switch 127 has ten positions and may select any one of the four capacitors of network 61 singly or any parallel combination of two or more. Thus, decade switch 127 in its ten positions may select capacitor values ranging from 100 to 1,000 units (microfarad) in steps of 100 units each. Similarly, decade switch 128 may select any one of the four capacitors of network 62 singly or any parallel combination of two or more. Thus, decade switch 128 may select capacitor values ranging from 10 to 100 units in steps of 10 units each. Decade switch 129 may select values ranging from 1 to 10 units in steps of one unit each. Thus, the three decade switches and their associated capacitors make available to the operator a thousand different capacitor values.

OPERATION

The manner in which the exposure control device of the present invention operates will now be described by considering its use in photographic printing. Assume that a test print of small size, such as 4″ x 5″, has been made and that the processor and his client are examining the print. They decide that the print should be 11″ x 14″, that it should be on different material, that it should have increased density, and that the red tones should be subdued and the blue tones accentuated. Having made these decisions, the processor or his operator adjusts the enlarging device to provide the increased magnification, he adjusts the lens opening, and he adjusts the color filters 12. These adjustments are made in accordance with calibration tables and charts which are available to the operator.

The operator then adjusts control knob 26 to read the new magnification factor on the dial, and in doing so he adjusts the arm of potentiometer 126 of FIG. 3 to provide a different voltage across the branch which includes potentiometer 125. The operator then adjusts control knob 25 to read on the dial a speed factor which corresponds to the rated speed of the printing material being used. The adjustment of control knob 25 adjusts the arm of potentiometer 125 of FIG. 3, thereby adjusting the voltage across the decade switches and capacitor networks 61, 62, 63.

The operator next adjusts control knobs 27, 28 and 29 to achieve the desired density correction. Adjustment of the three control knobs 27, 28 and 29 adjusts the decade switches 127, 128 and 129 of FIG. 3 to make connection, in each of the capacitor networks 61, 62 and 63, to the particular capacitor, or to the particular combination of capacitors, which is proper for the desired density.

Having done these things. the operator next flips the power switch 23 to the ON position. This closes the double-pole switch 123 in FIG. 2 and turns on the power to the system. Next, the operator may flip the focus switch 22 to the ON position to close the switch 122 of FIG. 2. This connects power to the enlarger lamp 10 and allows the operator to adjust the focus and compose the picture. The focus switch 22 is then returned to the OFF position, thus returning switch 122 to the open position.

It will be seen that when the power switch 123 is closed by the operator, a regulated negative voltage of −105 volts appears at terminal 38 relative to ground, and a lesser negative voltage is impressed through the normally-closed contacts 41–1 of relay 41 and the decade switches 127, 128, 129 to the capacitor networks 61, 62 and 63. The capacitors connected by the decade switches then charge toward said lesser negative voltage, determined by the settings of the arms of potentiometers 125 and 126. It will be understood that while the voltage to which the capacitor networks charge is determined by the setting of the potentiometer arms, the charge which accumulates in the capacitors is a function not only of the voltage applied but also of the total capacitance of the connected capacitors as controlled by the setting of the decade switches 127, 128 and 129.

In summary, in the system of FIG. 3, as soon as the power switch 123 has been closed, and before the timer start button 24 has been depressed, a charge accumulates in the connected capacitors of networks 61, 62, 63. The magnitude of this charge is a function of the setting of the magnification control (potentiometer 126), the setting of the reactance or speed-factor control (potentiometer 125), and the setting of the density factor controls (the decade switches 127, 128, 129). The enlarger lamp is not yet ON and photo-cell 45 is not illuminated, hence it is substantially non-conductive.

The operator then places printing material of the desired type in position and is now ready to make the exposure. He depresses the spring-biased start button 24 to close momentarily the switch 124 of FIG. 3. Closing the switch 124 connects the positive voltage terminal 40 (+300 v.) to the anode of triode 47, and triode 47 conducts. Current flows through resistors 49 and 55 and the cathode 52 of triode 47 rises quickly to a positive potential, sufficient to fire the voltage regulator tube 48. The action is very fast and it may be considered that the regulator tube 48 fires immediately. A positive voltage, for example +105 v., is then maintained across the regulator tube, and this voltage is applied to the anode of the photocell 45.

When the start push button 24 is depressed and switch 124 closes and current flows through triode 47, the coil of relay 56 becomes energized, and the normally-open contacts 56-1 thereupon close. Current then flows from the negative voltage terminal 39 (−150 v.) through the winding of relay 41, thus energizing relay 41. The normally-closed contacts 41-1 of relay 41 now open and the normally-open contacts 41-2 (FIG. 2) and 41-3 (FIG. 3) close.

The closing of contacts 41-3 maintains the circuit through relay 56, triode 47 and regulator tube 48. The closing of contacts 41-2 applies power to the light socket 33, and the light bulb 10 becomes luminous. The opening of contacts 41-1 disconnects the negative voltage terminal 38 from the capacitor networks 61, 62, 63 and the charged capacitors in these three networks now discharge through the photo-conductive cells 45 which is now illuminated by the filtered light from lamp 10. The rate at which the capacitors of networks 61, 62, 63 discharge is a function of the current conduction capabilities of the photo-conductive cell 45 which in turn is a function of the amount and wavelength of light being received by the photo-conductive cells 45. As seen in FIG. 1, the light received by the photo-conductive cells 45 is the light from the enlarger lamp 10 as filtered by the adjustable color filter 12. Thus, the adjustment which the operator made to the color filter 12 for the purpose, in the present example, of subduing the reds and accentuating the blues, modifies proportionately the effective illumination of both the sensitive material and the photo-conductive cells 45.

When the negative charge on the now discharging capacitor networks 61, 62 and 63 becomes sufficiently reduced, triode 46 conducts. The resulting current flow through resistor 54 causes the grid of 47 to become negative relative to its cathode and triode 47 now cuts off. Relay 56 now becomes deenergized and its contacts 56-1 open. This deenergizes relay 41 and its contacts 41-1 close and its contacts 41-2 and 41-3 open. Opening of contacts 41-2 extinguishes the lamp 10, and opening of contacts 41-3 places the circuit in its original condition, ready for the next exposure.

It will be seen that the circuit of FIG. 3 provides a control system for controlling automatically the exposure of the sensitive material according to the settings of a plurality of adjustments relating to (1) magnification, (2) reactance, or photo-sensitivity, of the sensitive material, (3) density factor, (4) light intensity. The device of the present invention is designed to manually accept information on all four of these factors.

The system automaically compensates for changes in the intensity of the light source and changes in intensity resulting from adjustments to filter 12.

Summarizing, the operator adjusts control knobs on the control unit to accommodate for the reactance of the sensitive material, for the magnification desired, and for the denstity desired. These three adjustments control the voltage applied to and the charge developed in the capacitor network. The capacitor network is charged before the exposure begins. The operator now presses the start button to initiate the exposure. The capacitors of the network discharge through the photo-conductive cell. The current conducted by the photo-conductive cell is a function of the effective intensity of the light being received by the photo-conductive cell. The intensity of the light received is a function of the brightness of the lamp as determined by its rating and the voltage applied thereto, and of the adjustments to the color filters.

While the preferred embodiment of this invention has been described in some detail, it will be obvious to one skilled in the art that various modifications may be made without departing from the invention as hereinafter claimed.

What is claimed is:

1. An exposure control system for applications such as photographic printing having a light source, an adjustable magnification factor, an adjustable lens aperture, an adjustable color filter, support means for the negative which is to be printed, and support means for the material to be exposed, said control system comprising:

(a) a photo-conductive cell mounted to receive color-filtered light from said source unchanged by said negative;
   (b) a regualted voltage source;
   (c) an electrical capacitor network;
   (d) first adjustable means for providing a first variable fraction of said regulated voltage, said first adjustable means providing adjustment according to the magnification factor of the exposing device;
   (e) second adjustable means for applying a second variable fraction of said first variable fraction of said regulated voltage across said capacitor network, said second adjustable means providing adjustment according to the speed factor of the sensitive material;
   (f) means for adjusting the total capacitance of said capacitor network to provide variable values of total capacitance according to the density factor as determined by the density of the negative;
   (g) switch means for applying energy from said regulated voltage source by way of said first and second adjustable means for charging said capacitor network prior to the beginning of the exposure period to a voltage level which is in correspondence with both the magnification factor and the speed factor and in accordance with the setting of said first and second adjustable means, thereby to accumulate in said capacitor network a total charge which is in correspondence with the density factor and in accordance with the setting of said means for adjusting the total capacitance of said network;
   (h) means connecting said photo-conductive cell across said capacitor network;
   (i) start switch means for energizing said light source to initiate the start of the exposure period;
   (j) means responsive to said start switch means for disconnecting said regulated voltage source from said capacitor network and for discharging said capacitor network through said photo-conductive cell at a rate which is in correspondence with the intensity of filtered light being received by said photo-conductive cell; and
   (k) means effective when the voltage across said capacitor network falls to a pre-selected value for extinguishing said light source to terminate the exposure period.

2. Apparatus according to claim 1 characterized in that said photo-conductive cell is located between said color filter and said negative support means.

3. Apparatus according to claim 2 further characterized in that said capacitor network comprises a plurality of sub-networks each controlled by a multi-position switch, each sub-network comprising a plurality of capacitors of different values.

4. Apparatus according to claim 3 further characterized in that said means responsive to said start switch means includes relay means having relay winding means in series with said start switch and having normally-closed contacts connecting said regulated voltage source to said capacitor network and normally-open contacts in series with said light source.

5. An exposure control system for applications such as photographic printing having a light source, an adjustable magnification factor, an adjustable lens aperture, an adjustable color filter, support means for the negative which is to be printed, and support means for the material to be exposed, said control system comprising:

(a) a photo-conductive cell mounted between said color filter and said negative support means to receive color-filtered light from said source unchanged by said negative;

(b) a regulated voltage source;

(c) an electrical capacitor network comprising a plurality of sub-networks, each sub-network comprising a plurality of capacitors of different values;

(d) first adjustable means for providing a first variable fraction of said regulated voltage, said first adjustable means providing adjustment according to the magnification factor of the exposing device;

(e) second adjustable means for applying a second variable fraction of said first variable fraction of said regulated voltage across said capacitor network, said second adjustable means providing adjustment according to the speed factor of the sensitive material;

(f) a multi-position switch for each sub-network for adjusting the total capacitance of said capacitor network to provide variable values of total capacitance according to the density factor as determined by the density of the negative;

(g) switch means for applying energy from said regulated voltage source by way of said first and second adjustable means for charging said capacitor network prior to the beginning of the exposure period to a voltage level which is in correspondence with both the magnification factor and the speed factor and in accordance with the setting of said first and second adjustable means, thereby to accumulate in said capacitor network a total charge which is in correspondence with the density factor and in accordance with the setting of said means for adjusting the total capacitance of said network;

(h) means connecting said photo-conductive cell across said capacitor network;

(i) start switch means for energizing said light source to initiate the start of the exposure period;

(j) means, including relay means, responsive to said start switch means for disconnecting said regulated voltage source from said capacitor network and for discharging said capacitor network through said photo-conductive cell at a rate which is in correspondence with the intensity of filtered light being received by said photo-conductive cell;

(k) said relay means having relay winding means in series with said start switch and having normally-closed contacts connecting said regulated voltage source to said capacitor network and normally-open contacts in series with said light source;

(l) said relay means including first and second relays;

(m) said relay winding in series with said start switch being the winding of said first relay, said first relay having normally-open contacts in series with the winding of said second relay;

(n) said normally-closed contacts connecting said regulated voltage source to said capacitor network being contacts of said second relay, said normally-open contacts in series with said light source also being contacts of said second relay; and (o) means effective when the voltage across said capacitor network falls to a pre-selected value for extinguishing said light source to terminate the exposure period.

6. Apparatus according to claim 5 further characterized in the said start switch and the winding of said first relay are connected in series with an electronic switch and a source of unregulated voltage.

7. Apparatus according to claim 6 further characterized in that said means for extinguishing said light source to terminate the exposure period when the voltage across said capacitor network falls to a preselected value includes a second electronic switch connected to and controlling the state of said first electronic switch, for opening the series circuit in which said first relay winding is included.

8. Apparatus according to claim 7 further characterized in that said first and second adjustable means comprise first and second potentiometers.

9. Apparatus according to claim 8 further characterized in that said photo-sensitive device is a broad spectrum photo-cell.

10. Apparatus according to claim 9 further characterized in that normally-open third contacts of said second relay are connected in shunt with said start switch.

References Cited

UNITED STATES PATENTS 3,100,419   8/1963   Clapp _____ 355—38

NORTON ANSHER, Primary Examiner

R. A. WINTERCORN, Assistant Examiner

U.S. Cl. X.R.

355—68, 71